(12) United States Patent
Matsuda et al.

(10) Patent No.: US 12,071,077 B2
(45) Date of Patent: Aug. 27, 2024

(54) POWER CONTROL UNIT MOUNTING STRUCTURE OF VEHICLE

(71) Applicant: SUBARU CORPORATION, Tokyo (JP)

(72) Inventors: Hiroshi Matsuda, Tokyo (JP); Hisayuki Nagatsu, Tokyo (JP); Kazuya Sakaimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 358 days.

(21) Appl. No.: 17/697,549

(22) Filed: Mar. 17, 2022

(65) Prior Publication Data

US 2022/0324393 A1 Oct. 13, 2022

(30) Foreign Application Priority Data

Apr. 7, 2021 (JP) ................. 2021-065501

(51) Int. Cl.
| | |
|---|---|
| *B60R 11/00* | (2006.01) |
| *B60K 5/04* | (2006.01) |
| *B62D 25/14* | (2006.01) |
| *F02M 35/104* | (2006.01) |

(52) U.S. Cl.
CPC ............... *B60R 11/00* (2013.01); *B60K 5/04* (2013.01); *B62D 25/145* (2013.01); *F02M 35/104* (2013.01); *B60R 2011/0038* (2013.01)

(58) Field of Classification Search
CPC ... B60R 11/00; B60K 5/04; B60R 2011/0038; B62D 25/145
See application file for complete search history.

(56) References Cited

U.S. PATENT DOCUMENTS

| | | | |
|---|---|---|---|
| 10,351,178 B2* | 7/2019 | Han .................. | B62D 25/2045 |
| 2004/0211613 A1 | 10/2004 | Asao et al. | |
| 2006/0220405 A1* | 10/2006 | Ohe ........................ | B60R 16/04 |
| | | | 296/37.1 |
| 2015/0283955 A1* | 10/2015 | Sakamoto ............. | F16B 5/0258 |
| | | | 248/636 |
| 2019/0281723 A1* | 9/2019 | Shiba .................... | B60L 3/0007 |
| 2019/0359068 A1* | 11/2019 | Marukawa .............. | B60K 1/00 |
| 2020/0086736 A1* | 3/2020 | Tomita ................... | B60R 13/00 |
| 2021/0003204 A1* | 1/2021 | Kita ...................... | F16H 57/027 |
| 2021/0053623 A1* | 2/2021 | Shimokouchi .......... | B60K 1/00 |

FOREIGN PATENT DOCUMENTS

JP 2004-328870 A 11/2004

* cited by examiner

*Primary Examiner* — Brian L Swenson
(74) *Attorney, Agent, or Firm* — MCGINN I.P. LAW GROUP, PLLC

(57) ABSTRACT

A power control unit mounting structure mounted on a vehicle includes an engine in an engine room at a front of the vehicle, an intake manifold disposed above the engine, a power control unit that is disposed above the engine, coupled to a cable, and controls power of a drive motor, and a toeboard cross member disposed on a toeboard. The engine and the toeboard cross member partly overlap in a projected plane along a fore-and-aft direction to provide a space behind the control unit in a front view of the vehicle. The intake manifold and the control unit are disposed within a contour of the engine in a plan view of the vehicle. The intake manifold is disposed ahead of the control unit, and portions of intake pipes of the intake manifold on both sides extend rearward and are partly opposed to both side surfaces of the control unit.

4 Claims, 3 Drawing Sheets

POWER CONTROL UNIT MOUNTING STRUCTURE OF VEHICLE

CROSS-REFERENCE TO RELATED APPLICATIONS

The present application claims priority from Japanese Patent Application No. 2021-065501 filed on Apr. 7, 2021, the entire contents of which are hereby incorporated by reference.

BACKGROUND

The disclosure relates to a power control unit mounting structure of a vehicle including an engine and a motor as power sources, with the engine being vertically oriented.

Recently, hybrid vehicles including two power sources, i.e., an engine and a traveling motor, have been in the market. In addition to an engine, a gasoline tank, and other components of the related art, such a hybrid vehicle includes, a traveling motor, a traction battery for driving to supply power to the traveling motor, a power control unit (PCU) to control power distribution, an auxiliary device battery to supply power to auxiliary devices, and the like.

For example, Japanese Unexamined Patent Application Publication (JP-A) No. 2004-328870 discloses a technique of a vehicle where a PCU disposed in an engine room of the vehicle is configured in such a manner that shear load onto bolts of fasteners disposed on side surfaces of a casing can be reduced upon a frontal collision of the vehicle.

SUMMARY

An aspect of the disclosure provides a power control unit mounting structure mounted on a vehicle. The power control unit mounting structure includes a longitudinal engine, an intake manifold, a power control unit, and a toeboard cross member. The longitudinal engine is mounted in an engine room at a front of the vehicle. The intake manifold is disposed above the longitudinal engine. The power control unit is disposed above the longitudinal engine and is coupled to a high-voltage cable. The power control unit is configured to control power of a drive motor from a driving battery. The toeboard cross member is disposed on a toeboard separating the engine room from a vehicle compartment of the vehicle. The longitudinal engine and the toeboard cross member partly overlap each other in a projected plane along a fore-and-aft direction to provide a space behind the power control unit in a front view of the vehicle. The intake manifold and the power control unit are disposed within a contour of the longitudinal engine in a plan view of the vehicle. The intake manifold is disposed in front of the power control unit. portions of intake pipes of the intake manifold disposed on left and right sides extend rearward and are partly opposed to both side surfaces of the power control unit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In order to improve the protection performance during a frontal collision, a CPU of a hybrid vehicle in the related art is disposed above a transmission of a transverse oriented engine in an engine room or beside an underfloor fuel tank at the rear of the vehicle.

However, when the hybrid vehicle includes a longitudinal engine, the PCU is not disposed above the transmission due to a lack of space. Besides, when the PCU is disposed on the engine side in front of a toeboard frame, a high-voltage cable may be ruptured by a rearward movement of the engine upon the frontal collision, and the PCU may block a supposed rearward movement of the engine.

It is desirable to provide a power control unit mounting structure of a hybrid vehicle including a longitudinal engine, in which even when a PCU is disposed in an engine room, the power control unit mounting structure prevents a high-voltage cable from being ruptured by a rearward movement of the engine upon a frontal collision, and prevents the PCU from blocking a supposed rearward movement of the engine.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
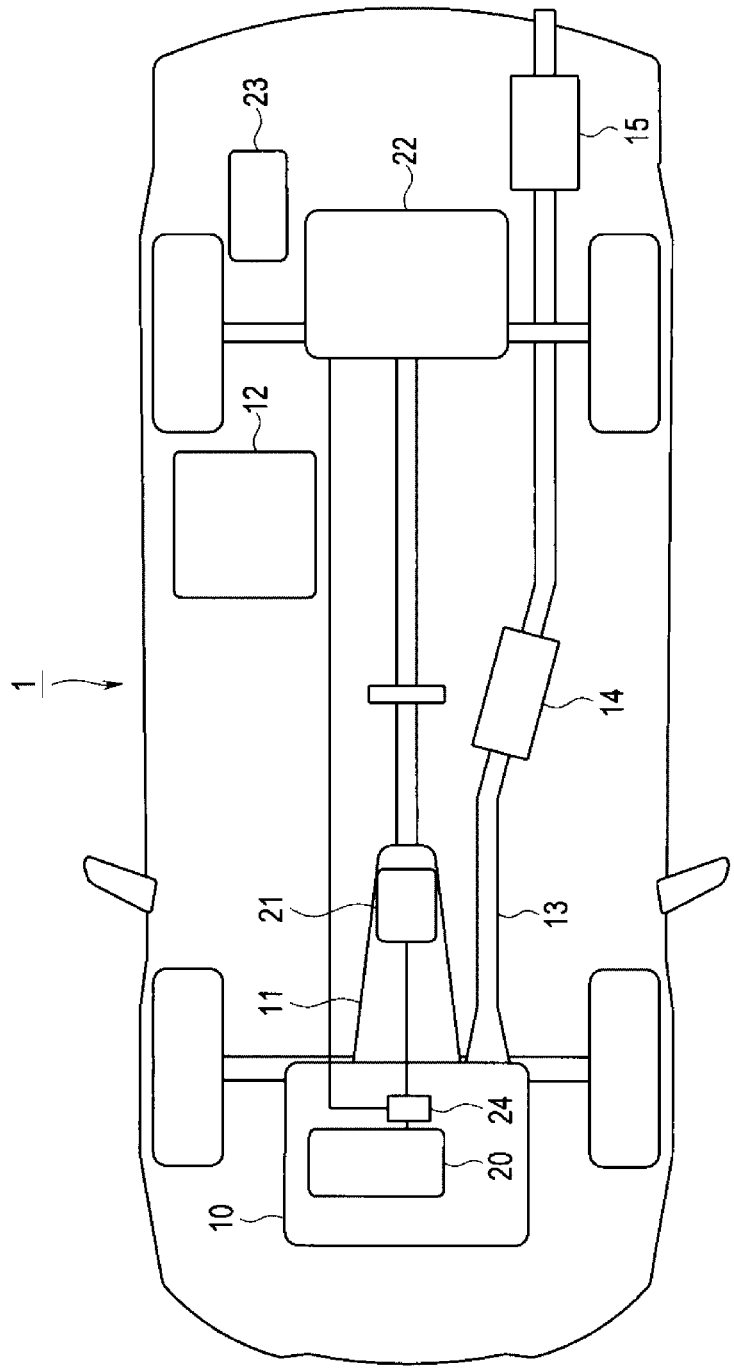
FIG. 1 is a schematic configuration diagram illustrating a hybrid vehicle.

A vehicle 1 in an example illustrated in FIG. 1 is a so-called hybrid vehicle including two power sources. A first power source is a longitudinal engine 10, which is an internal combustion engine, to serve as a drive source. Above the engine 10, an intake manifold 16 is disposed to take in air from outside the vehicle.

The engine 10 is coupled to a transmission 11. At the rear of the vehicle 1, a fuel tank 12 is disposed to store fuel for the engine 10. An exhaust pipe 13 is coupled to the engine 10 with an exhaust manifold, not illustrated here, and extends rearward of the vehicle 1. A pre-silencer 14 and a main silencer 15 as mufflers containing catalyst are disposed on the exhaust pipe 13.

A second power source is a motor-generator 21, which is an electric motor having a start-up function and a power generation function. The motor-generator 21 is incorporated in the transmission 11. With a power control unit (PCU) 20, which is a power management unit, the motor-generator 21 is electrically connected to a driving battery 22, which is a secondary battery disposed at the rear of the vehicle 1. It is noted that an auxiliary device battery 23 is disposed at the rear of the vehicle 1. In some cases, the auxiliary device battery 23 is disposed in the vicinity of the engine 10 at the front of the vehicle 1.

Figure 2:
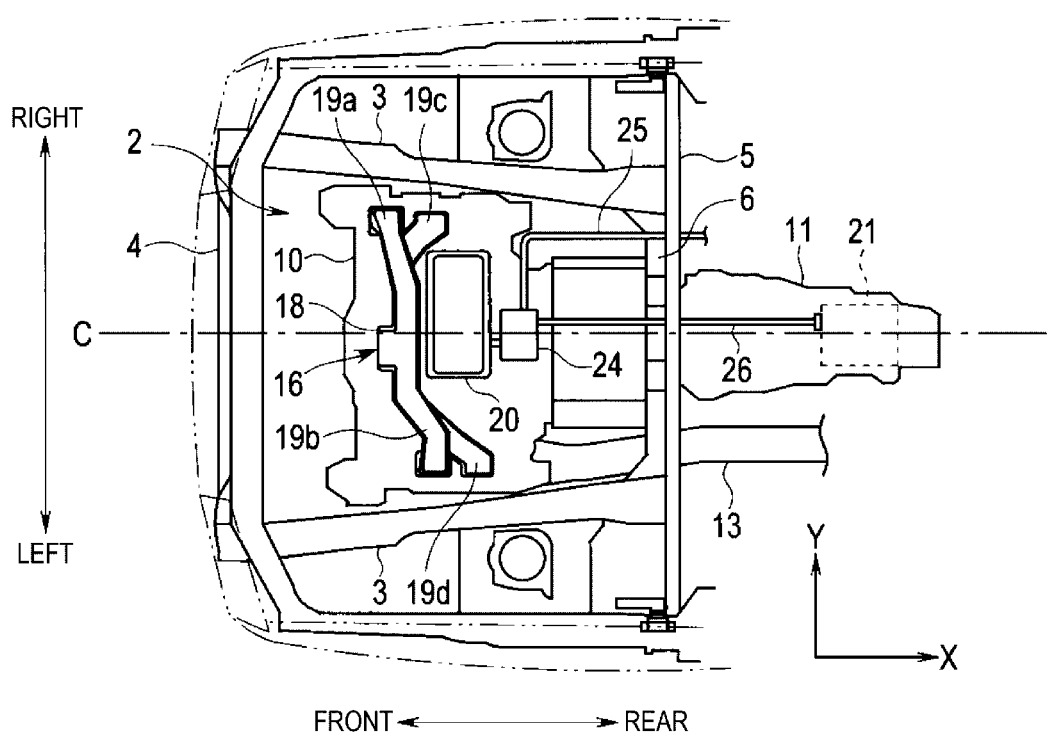
FIG. 2 is a schematic plan view illustrating a configuration of a front of the vehicle.
Figure 3:
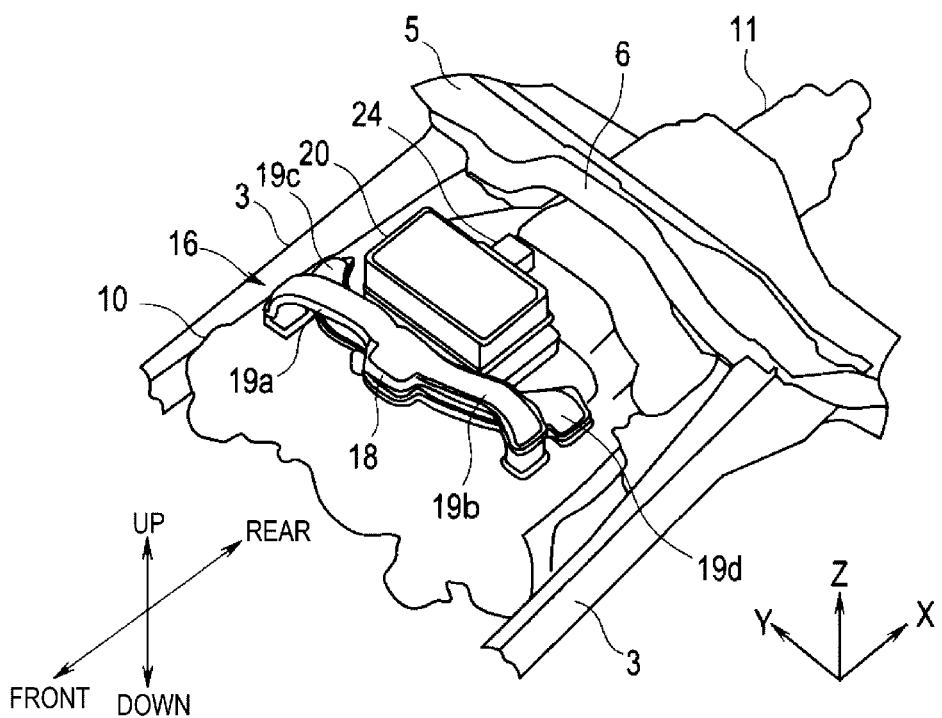
FIG. 3 is a schematic perspective view illustrating the configuration of the front of the vehicle.
Figure 4:
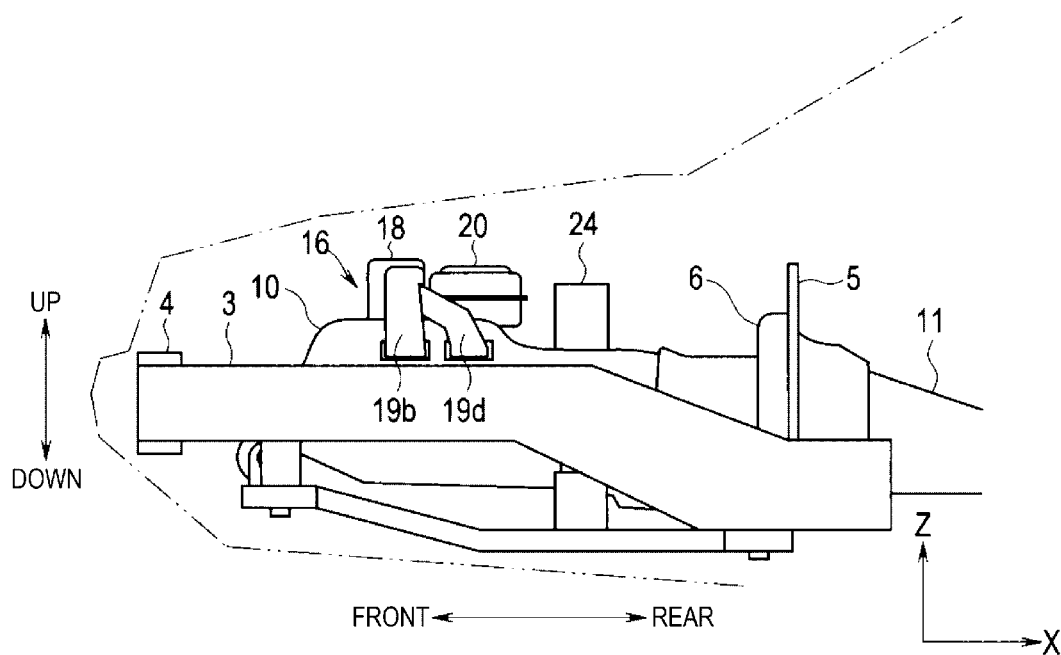
FIG. 4 is a schematic side view illustrating the configuration of the front of the vehicle.

As illustrated in FIG. 2, the engine 10 is mounted in an engine room 2 surrounded by side frames 3, a front cross member 4 serving also as a radiator core support, and a toeboard 5 at the front of the vehicle 1. It is noted that the engine 10 is mounted in the engine room 2 and vertically oriented in such a manner that a crankshaft, not illustrated, is parallel to a fore-and-aft direction of the vehicle 1.

The toeboard 5, also called a dash-panel, is a partition wall board separating the engine room 2 from a vehicle compartment behind the engine room 2. This toeboard 5 includes a toeboard cross member 6 protruding to the engine room 2 side.

The PCU 20 mainly includes an inverter and a DC-DC converter. This PCU 20 performs conversion between alternating current (AC) and direct current (DC) using the inverter. It is noted that when the inverter of the PCU 20 converts DC power of the driving battery 22 into AC power to drive the motor-generator 21, the inverter controls a rotational speed and a torque.

The inverter of the PCU 20 converts AC power output by the motor-generator 21 during deceleration of the vehicle 1 into DC power to charge the driving battery 22. The DC-DC converter of the PCU 20 raises output voltage of the driving battery 22 and then inputs DC power to the inverter.

The PCU 20 is coupled to a PCU terminal block 24, which is a high-voltage junction box disposed above the engine 10, with a connector, for example. The PCU terminal block 24 is also electrically connected to the driving battery 22, the motor-generator 21, and high-voltage cables 25 and 26 with connectors, for example.

A detailed description will now be made on a layout of the intake manifold 16 of the engine 10, the PCU 20, the PCU terminal block 24, and the toeboard cross member 6 of the toeboard 5 in a power control unit mounting structure of the vehicle 1.

In the vehicle 1, as illustrated in FIG. 2 to FIG. 5, the PCU 20 is disposed above the engine 10 mounted in the engine room 2 at the vehicle front. This PCU 20 is disposed closer to the rear of the vehicle 1 than the intake manifold 16 of the engine 10 is. Moreover, the PCU 20 is closer to the front of the vehicle 1 than the toeboard 5 as a part of a vehicle body is.

It is noted that there is a space above the engine 10 and between the intake manifold 16 and the toeboard cross member 6 of the toeboard 5, and that the PCU 20 is disposed at a position in this space. Furthermore, there is also a space above the engine 10 and between the PCU 20 and the toeboard cross member 6.

The high-voltage cable 25 electrically connecting the PCU 20 and the driving battery 22 to each other extends to the driving battery 22 mounted at the rear of the vehicle 1. This high-voltage cable 25 is coupled to the PCU terminal block 24. Then, the PCU terminal block 24 is mounted above the engine 10 and disposed in the space between the PCU 20 and the toeboard cross member 6.

In this manner, in the power control unit mounting structure of the vehicle 1, the intake manifold 16 of the engine 10, the PCU 20, the PCU terminal block 24, and the toeboard cross member 6 of the toeboard 5 are disposed in sequence from the front in the fore-and-aft direction (X direction in the drawings) of the vehicle 1. That is, in a front view of the vehicle 1, the intake manifold 16, the PCU 20, the PCU terminal block 24, and the toeboard cross member 6 in sequence from the front partly or wholly overlap one another in a projected plane along the fore-and-aft direction (see FIG. 5).

Furthermore, the intake manifold 16, the PCU 20, and the PCU terminal block 24 are disposed within a contour of the engine 10 in a plan view of (as viewed from above) the engine 10. It is noted that the engine 10 is disposed in such a manner that both side ends of the engine 10 in a lateral direction (Y direction in the drawings), which is a vehicle width direction, and an upper end of the engine 10 in a vertical direction (Z direction in the drawings), which is a vehicle vertical direction, partly overlap the toeboard cross member 6 in the projected plane along the fore-and-aft direction (see FIG. 5).

According to the above-described layout configuration of the engine room 2 disposed at the front of the vehicle 1, in the power control unit mounting structure of the vehicle 1, the intake manifold 16 is in front of the PCU 20, and the PCU terminal block 24 and the toeboard cross member 6 are behind the PCU 20. Therefore, collision load from ahead of the vehicle 1 upon a vehicle frontal collision can be prevented from being directly input to the PCU 20 and the PCU terminal block 24. Moreover, the space is provided behind the PCU 20, so that a space for mounting the PCU terminal block 24 can be secured, and so that the PCU 20 can be prevented from hindering a rearward movement of the engine 10 during the vehicle frontal collision.

Furthermore, in the power control unit mounting structure of the vehicle 1, the intake manifold 16, the PCU 20, and the PCU terminal block 24 are shifted and displaced from one another in the fore-and-aft direction within the contour of the engine 10 in a plan view. That is, the intake manifold 16, the PCU 20, and the PCU terminal block 24 are displaced from one another in the fore-and-aft direction of the vehicle 1 within the contour of the engine 10 in a plan view. Consequently, the front PCU mounting structure of the vehicle 1 also protects the intake manifold 16, the PCU 20, and the PCU terminal block 24 from the input of collision load from any of the following directions: from the front; diagonally; and from a side, upon a vehicle collision.

The intake manifold 16 includes four intake pipes 19a, 19b, 19c, and 19d that collectively communicate with a center surge tank 18 including a throttle body. The intake pipes 19a, 19b, 19c, and 19d extend to the left and right in the vehicle width direction and overlap each other vertically. With at least the right and left intake pipes 19c and 19d being bent and extending rearward, the intake manifold 16 has a U shape (open-box shape) in a plan view. In other words, the intake manifold 16 has such a shape that the center surge tank 18 is shifted forward.

The PCU 20 is disposed above the engine 10 in such a manner that both side surfaces of the PCU 20 are partly opposed to the two intake pipes 19c and 19d of the intake manifold 16 that are bent and extend rearward of the vehicle 1. Consequently, the front PCU mounting structure of the vehicle 1 can further protect the PCU 20 from the input of collision load from any of the following directions: from the front; diagonally from the front; and from a side upon the vehicle collision.

Moreover, the intake manifold 16 is shifted in such a manner that one of the left and right ends of the intake manifold 16, e.g., end portions of the right intake pipes 19a and 19c in this example that are coupled to the engine 10 are displaced forward. That is, the intake manifold 16 has such a shape that end portions of the left and right intake pipes 19a, 19b, 19c, and 19d in the vehicle width direction are displaced from one another in the fore-and-aft direction.

Consequently, the front PCU mounting structure of the vehicle 1 leaves a margin in a mounting space above the engine 10 and behind the two intake pipes 19a and 19c on the right side of the intake manifold 16 in this example so that the PCU 20 can be disposed at a shifted position above the engine 10, with the center of the PCU 20 being displaced to the right side of a center axis C of the engine 10 that is orthogonal to the vehicle width direction (lateral direction).

Figure 5:
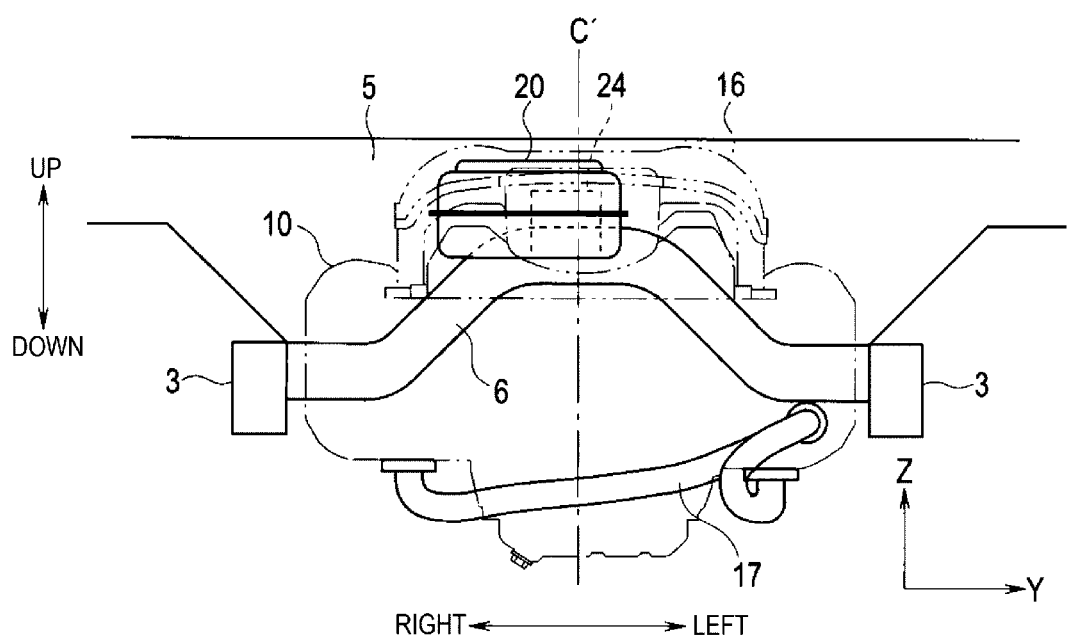
FIG. 5 is a schematic front view illustrating the configuration of the front of the vehicle.

The PCU 20 is shifted in such a manner that the center of the PCU 20 is displaced from the center axis C (see FIG. 2) of the engine 10 that is orthogonal to the vehicle width direction to either one of the left and right sides, e.g., an upper right side of the engine 10 in this example. As illustrated in FIG. 5, the exhaust pipe 13 coupled to an exhaust manifold 17 coupled to a lower portion of the engine 10 is shifted in such a manner that the exhaust pipe 13 is displaced to either one of the left and right sides, e.g., a lower left side of the engine 10 in this example (a lower right side of a center axis C' in FIG. 5). In other words, the PCU 20 and the exhaust pipe 13 are shifted from the center axes C and C' of the engine 10 that are orthogonal to the vehicle width direction such that the PCU 20 and the exhaust pipe 13 are displaced from each other in opposite lateral directions.

Thus, the power control unit mounting structure of the vehicle 1 can increase a separation distance of the PCU 20 from the exhaust pipe 13 in the exhaust system that is to be a heat source, thereby preventing the exhaust system from thermally affecting the PCU 20.

It is noted that the PCU terminal block 24 is shifted from the PCU 20 toward the center axis C of the engine 10 that is orthogonal to the vehicle width direction. Thus, the power control unit mounting structure of the vehicle 1 can notably decrease a path (length) of the high-voltage cable 26 that electrically connects the motor-generator 21 and the PCU terminal block 24 to each other. With the path of the high-voltage cable 26 that connects the PCU terminal block 24 to the motor-generator 21 being shortened, the cause of rupturing the high-voltage cable 26 during a vehicle frontal collision can be reduced.

The above-described power control unit mounting structure of the vehicle 1 can provide the space for mounting the PCU 20 above the longitudinal engine 10 in the engine room 2 of the vehicle 1, which is a hybrid vehicle, so as to prevent the high-voltage cables 25 and 26 from being ruptured by a rearward movement of the engine 10 upon a frontal collision, and to prevent the PCU 20 from blocking a supposed rearward movement of the engine 10.

Furthermore, because the PCU 20 is not disposed at the rear of the vehicle 1, the fuel tank 12 can be enlarged to increase a tankage.

The disclosure in the above embodiments is not to be limited to the described modes and may be modified in various manners at an implementation stage without departing from the subject matter. Furthermore, each of the above-described embodiments includes disclosures at various stages so that various disclosures can be derived by suitably combining a plurality of elements disclosed herein.

For example, even when some elements are removed from all the elements described in each of the embodiments, a configuration from which these elements have been removed can be derived as a disclosure insofar as the stated circumstances can be addressed and the stated effects can be obtained.

The invention claimed is:

1. A power control unit mounting structure mounted on a vehicle, the power control unit mounting structure comprising:
 a longitudinal engine mounted in an engine room at a front of the vehicle;
 an intake manifold disposed above the longitudinal engine;
 a power control unit disposed above the longitudinal engine and coupled to a high-voltage cable, the power control unit being configured to control power of a drive motor from a driving battery; and
 a toeboard cross member disposed on a toeboard separating the engine room from a vehicle compartment of the vehicle,
 wherein the longitudinal engine and the toeboard cross member partly overlap each other in a projected plane along a fore-and-aft direction to provide a space behind the power control unit in a front view of the vehicle,
 wherein the intake manifold and the power control unit are disposed within a contour of the longitudinal engine in a plan view of the vehicle, and
 wherein the intake manifold is disposed in front of the power control unit, and portions of intake pipes of the intake manifold disposed on left and right sides extend rearward and are partly opposed to both side surfaces of the power control unit.

2. The power control unit mounting structure according to claim 1,
 wherein below the longitudinal engine, an exhaust pipe is shifted and displaced to a first one of leftward and rightward directions from a center axis of the longitudinal engine, the center axis being orthogonal to a vehicle width direction of the vehicle, and
 the power control unit is shifted from the exhaust pipe and displaced to a second one of the leftward and rightward directions from the center axis, the second one being different from the first one.

3. The power control unit mounting structure according to claim 1,
 wherein the intake manifold is shifted in such a manner that ones of the intake pipes on one of the left and right sides in a vehicle width direction of the vehicle are displaced forward, and
 wherein the power control unit is disposed behind the intake pipes displaced forward.

4. The power control unit mounting structure according to claim 1, further comprising a power control unit terminal block disposed in the space above the longitudinal engine and coupled to the high-voltage cable, the power control unit terminal block being shifted from the power control unit and displaced toward a center axis of the longitudinal engine that is orthogonal to a vehicle width direction of the vehicle.

* * * * *